Aug. 23, 1938.  W. H. EDMONDSON  2,127,680
TEMPERATURE CONTROL MECHANISM
Filed April 28, 1937  3 Sheets-Sheet 1
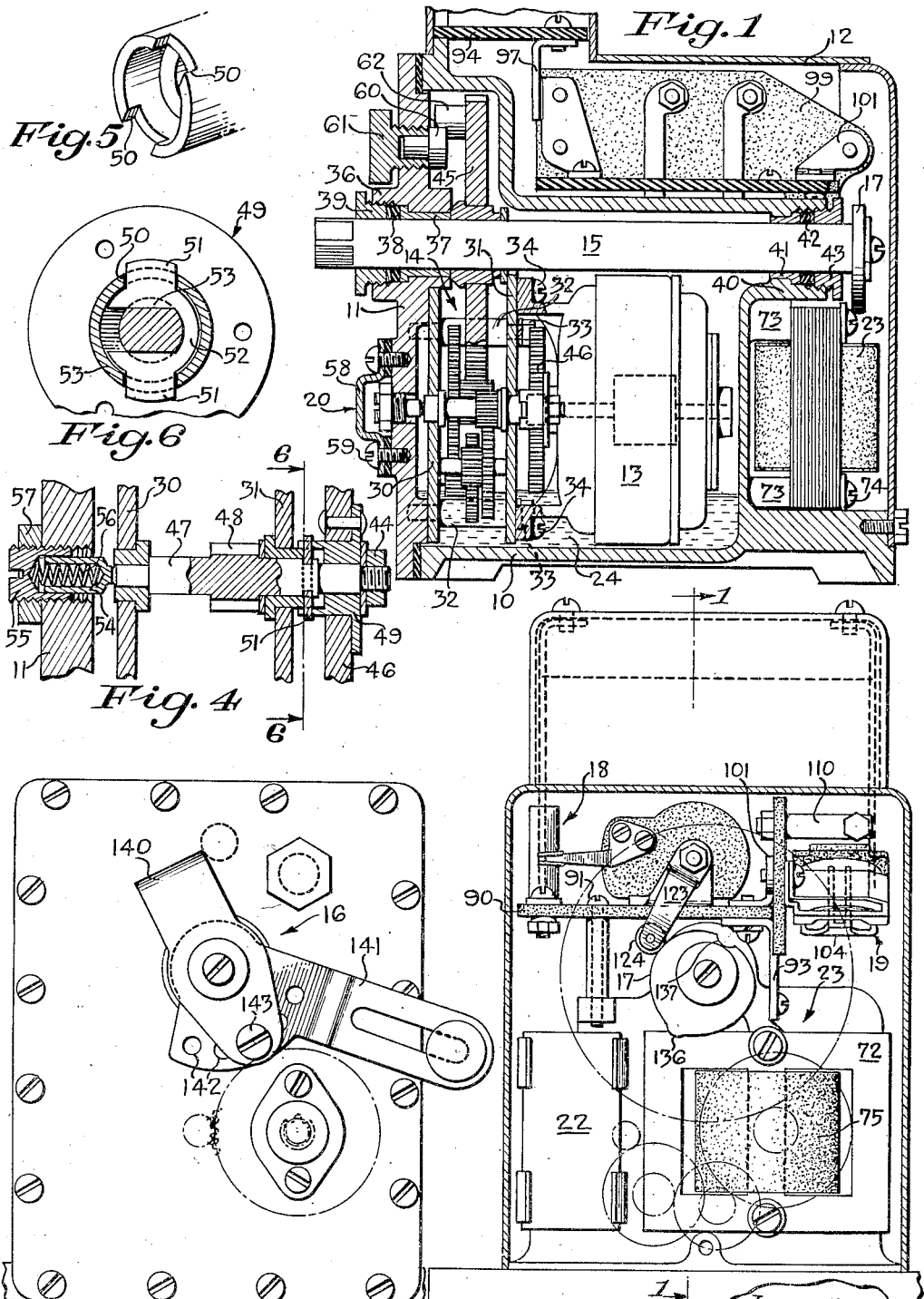
Inventor
William H. Edmondson
By George H. Fisher
Attorney

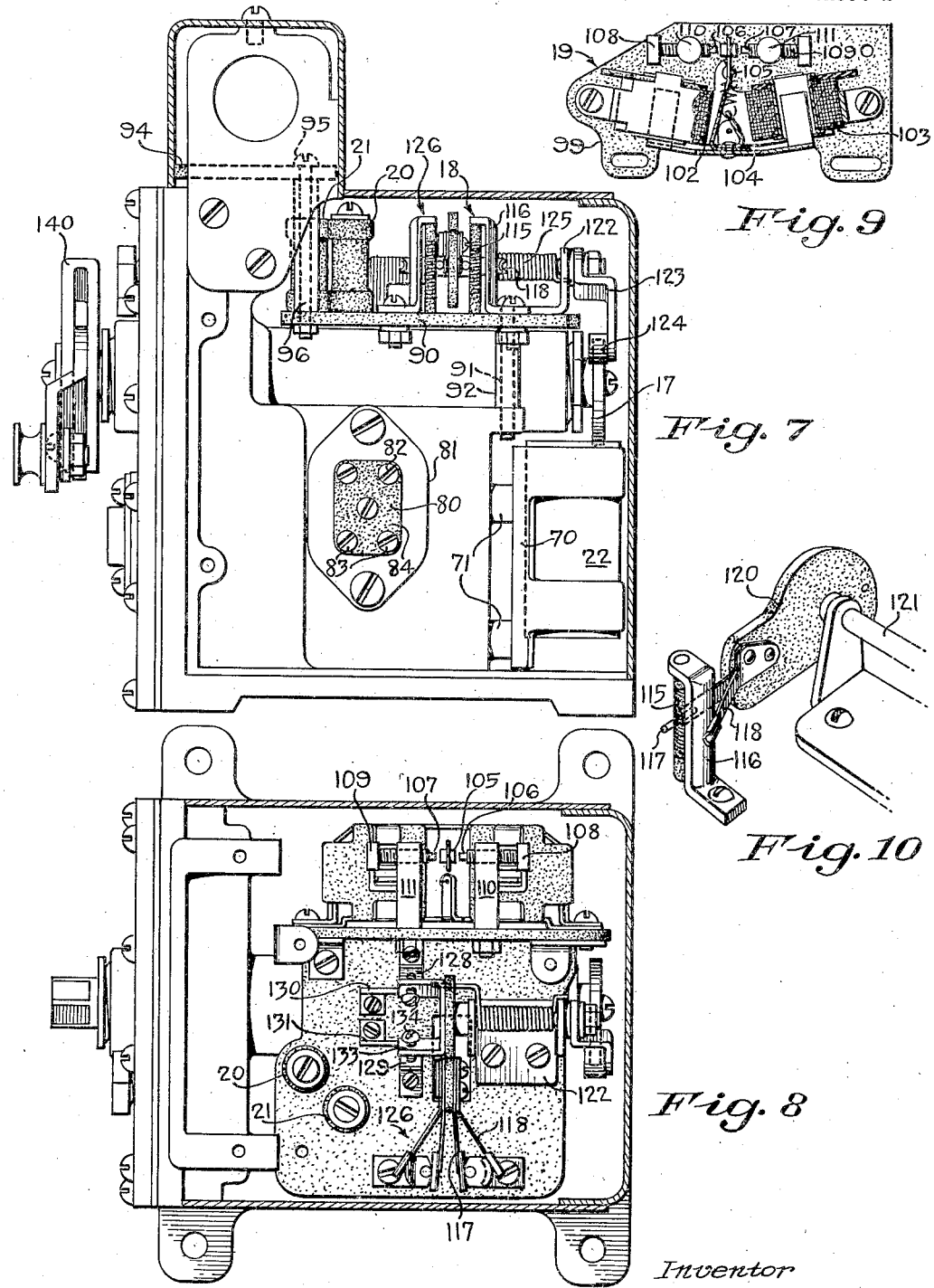

Aug. 23, 1938.  W. H. EDMONDSON  2,127,680
TEMPERATURE CONTROL MECHANISM
Filed April 28, 1937  3 Sheets-Sheet 3

Inventor
William H. Edmondson
By George H. Fisher
Attorney

Patented Aug. 23, 1938

2,127,680

UNITED STATES PATENT OFFICE 2,127,680

TEMPERATURE CONTROL MECHANISM

William H. Edmondson, Oak Park, Ill., assignor to Minneapolis-Honeywell Regulator Company, Minneapolis, Minn., a corporation of Delaware Application April 28, 1937, Serial No. 139,633

14 Claims. (Cl. 171—252)

My invention relates to temperature control apparatus.

In apparatus used for the controlling of temperature, it is imperative that the apparatus operate with extreme accuracy. This is particularly true where the system is of the follow-up type wherein a valve or some other regulating device for a heater is variably positioned in accordance with some controlling condition. Such apparatus must meet the requirement, not only of being quite accurate in operation but also of operating rather heavy loads. In many cases, it is necessary to have the apparatus operating the valve, damper, or other similar controlling member to be capable of lifting loads as great as 50 to 60 pounds. At the same time, this apparatus is to be controlled by delicate and sensitive control equipment which must be so small as to be relatively inconspicuous in the room in which it is placed. It will, accordingly, be seen that the design of temperature controlling apparatus involves problems which are peculiar to that art and differ from other arts wherein either accuracy alone or power alone is sufficient.

The present apparatus, as previously indicated, is particularly adapted for use in control systems of the follow-up type. It has been found that it is extremely desirable in such systems to employ a motor of the condenser type for driving the controlled apparatus. Such a motor provides relatively efficient operation combined with a sufficiently high starting torque for the operation of the regulating device. The use of a condenser motor, however, has the disadvantage that it requires the use of a relatively large condenser and usually a transformer. Since a third requirement of temperature control apparatus is that it be extremely compact, the use of a condenser motor in temperature control apparatus has been objected to for this reason.

An object of the present invention is to provide a highly compact temperature control mechanism, particularly one employing a condenser motor which is both extremely accurate and extremely powerful. The invention resides in the various features and structural arrangements by which this is accomplished.

In the apparatus in question, a housing is provided which encloses a motor, a reduction gear train and an operating shaft with the motor and reduction gear train partially immersed in oil. The housing is provided with a removable side wall and the motor and the gear train are entirely supported by this side wall. In this way, there is no danger of any misalignment, whatsoever, of any of the gears or of the motor arising by reason of any variations in the position of the removable side wall with respect to the rest of the housing. In this manner, it is assured that the accuracy of the apparatus is preserved. Due, however, to the rather large load which the shaft must carry, it is impossible to have it journaled entirely from the side wall. In order, accordingly, to minimize the effect of any variations in the position of the side wall with respect to the rest of the housing, the bearings are spaced as widely apart as possible. This is done by providing one bearing for the shaft in the removable side wall and by projecting outwardly a portion of the opposite side wall and locating the other bearing in this outwardly projecting portion. The outwardly projecting portion is so arranged, however, with respect to its height above the base that provision is made underneath the projecting portion for the condenser and transformer employed with the motor. Moreover, the various switch mechanisms which are employed for control of the motor are extended above the projecting portion so that all of the space surrounding the projecting portion is efficiently utilized in this way and extremely wide spacings of the bearings of the shaft are obtained without in any way decreasing the compactness of the apparatus. The apparatus also employs a friction brake which extends through the removable wall and which serves to prevent the apparatus from coasting upon being deenergized.

For a more complete understanding of the present invention, reference is made to the accompanying specification, claims and drawings of which Figure 1 is a vertical sectional view taken along the line 1—1 of Figure 2;

Figure 2 is an end view of the apparatus looking toward the right hand end of Figure 1, with the casing shown in section;

Figure 3 is an end view looking towards the left hand end of Figure 1;

Figures 4, 5 and 6 are detailed views of a portion of the gear train and of the friction brake;

Figure 7 is a front elevational view with the casing shown in section;

Figure 8 is a top plan view, the casing being shown in section;

Figure 9 is a view of a relay employed in the apparatus;

Figure 10 is a view of a follow-up potentiometer forming a portion of the apparatus.

Figure 11:
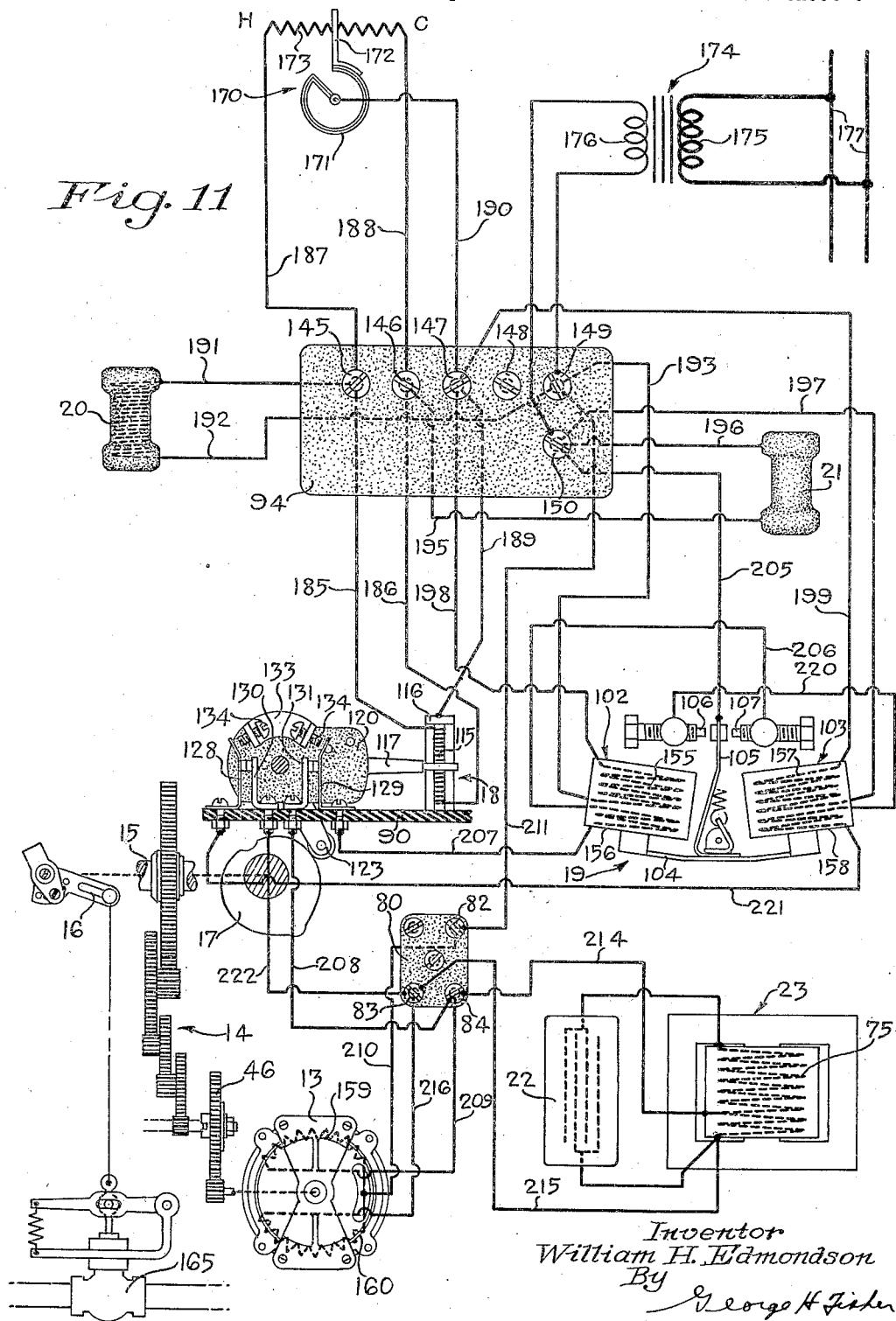
Figure 11 is a schematic view of a temperature control system employing the apparatus in question.

Referring to the drawings, the housing for the motor and gear train is designated by the reference numeral 10. This housing has a removable side wall 11. Over the entire apparatus is an outer casing 12. Within the housing is a motor unit 13 of a condenser motor. The motor unit is operatively connected by a gear train 14 with a shaft 15. At one end of the shaft 15 is an arm 16 (best shown in Figure 3), which arm is adapted to be connected to a regulating device of some condition changing means. At the other end of the shaft 15 is a cam 17 which is designed to actuate a potentiometer 18 which, in turn, controls the energization of a relay 19. The relay 19 controls the operation of the motor 13. Mounted above the housing with the potentiometer and relay is a pair of resistances 20 and 21. Mounted outside of the housing beneath a projecting portion thereof are a condenser 22 and a transformer 23 which are associated with the motor unit 13. Within the housing is oil 24 which submerges the lower end of the gear train.

Referring now more particularly to the details of construction of the apparatus, the gear train 14 is entirely journaled in two plates 30 and 31 which are secured to the side wall 11. Interposed between these two plates are spacer sleeves 32 and extending through these spacer sleeves are cap screws 33 or other suitable fastening means, which with the sleeve serve to secure the plates 30 and 31 in definite spaced relation to each other and to the side wall 11. The motor 13 is secured through screws 34 to the plate 31. In this matter, it will be seen that both the motor and the gear train are entirely supported by the end plate 11 so that the alignment of the various gears of the gear train with each other and with the motor is independent of the position of plate 11.

As previously stated, it is impossible to support the shaft 15 entirely from the movable side wall. One bearing for the shaft is, however, provided in the side wall. The side wall 11 has an enlarged portion 36 and in this enlarged portion is a bushing 37. Packing 38 surrounds the shaft in contact with the bushing and is held in position by a screw gland 39. In the opposite wall of the housing there is a projecting portion 40. In this projecting portion a bushing 41 is located and associated with this bushing is packing 42 and a screw gland 43. It will be readily seen that the two bearings for the shaft 15 are very widely spaced from each other so that any shifting in the position of removable wall 11 with respect to the rest of the housing has little effect on the angular position of shaft 15.

Non-rotatably secured to the shaft 15 is gear 45 which is adapted to constitute the end gear at the low speed end of the gear train. A fiber gear 46 is provided for connection to the high speed end of the gear train. This gear, as best shown in Fig. 4, is mounted upon a shaft 47. The fiber gear 46 is connected with the pinion gear on the shaft of the motor. The shaft 47 is, in turn, provided with gear teeth 48 which cooperate with the first gear of the gear train. In order to assemble the shaft 47 with its teeth 48 and relatively large gear 46 with respect to the plate 31, it is necessary to have the gear 46 removable from the shaft 47 and to provide a non-rotatable connection between the gear and the shaft. The gear 46 is, accordingly, mounted on a flanged sleeve 49. This sleeve, as indicated in Figures 5 and 6, is provided with diametrically opposed slots 50.

Extending through these slots 50 are the ears 51 of a key member 52. This key member is provided with an open ended slot and is secured in flat bottom slots 53 in the shaft 47. It will be readily seen that any rotation of the sleeve 49 with respect to the shaft 47 is effectively prevented by this keying arrangement. A nut 44 or other suitable means, is employed to retain the flanged sleeve 49 and accordingly the fiber gear 46 on the shaft 47.

Cooperating with the outer end of the shaft 47 is a hollow braking member 54. This braking member is slidably located within a hollow stud 55. A spring 56 is located within the hollow braking member and has one end bearing against the stud, serving to urge the braking member into braking engagement with the shaft 47. By screwing the stud 55 in or out of the side wall 11, it will be readily seen that it is possible to very easily adjust the braking action on the shaft 47. A lock nut 57 is provided for the purpose of locking the stud 55 in adjusted position. Surrounding the lock nut and the exposed end of the stud 55 is a housing 58 which is secured to the side wall by screws 59 or other suitable fastening means. The provision of the friction brake makes it possible upon deenergization of the motor to have the apparatus stop almost instantly. This is highly desirable for the purpose of accuracy.

A pin 60 is supported by a plug 61 extending into the side wall 11. The pin 60 extends into the housing and cooperates with a pin 62 located upon the end gear 45. The purposes of pins 60 and 62 are to limit the movement of the shaft in one direction. This is effected by the engagement of pin 62 with pin 60. The plug 61 is removable to permit replenishing of the oil in the housing.

Secured to the outside of the housing 10 beneath the projecting portion 40 is a four pronged clip 70 which serves to support condenser 22 as best shown in Figure 7. This clip 70 is secured by any suitable fastening means to studs 71 projecting from the housing. The transformer 23 comprises a transformer core 72 and a winding 75. The transformer is mounted by screws 74 to studs 73 as best indicated in Figure 1. The transformer, as will be more apparent from the subsequent description, is of the auto-transformer type and is for the purpose of increasing the voltage across the condenser 22.

Located in the side wall of the housing is a terminal plate 80, as best shown in Figure 7. This terminal plate is secured to a mounting plate 81 which is secured to the housing in oil tight relation. Terminal plate 80 is provided with terminals 82, 83 and 84 and it is adapted to furnish a means for introducing current to the motor 13, while preventing escape of the oil from the housing.

A plate 90 of insulating material is secured above the housing. One corner of the plate is secured to the housing by a screw 91 which extends through a spacer sleeve 92 interposed between the housing and the plate 90. This construction is best shown in Figures 2 and 7. A second corner of the plate, as best shown in Figure 2, is supported by a right angled bracket 93. The third corner, as indicated in Figure 7, is supported from a terminal plate 94 which rests on the top of the housing. A bolt 95 serves to support this corner of the plate 90 from insulating plate 94. Spacer sleeve 96 surrounds the bolt 95 and spaces the plates 90 and 94. The fourth corner of the plate 90 is supported from the plate 94 by a bracket 97, as indicated in Figure 1. The bracket 97 also serves to secure a vertical plate 99 of insulating material to the plate 90. This vertical plate 99 is further secured to the horizontal plate 90 by a bracket 101.

Secured to the vertical plate 99 is a relay which controls the operation of the motor. One preferable form of the relay is the balanced type shown in the application of Willis H. Gille, Serial No. 758,231, filed December 19, 1934. Reference is made to that application for a detailed description of the relay. The essential elements of the device, however, as far as the present invention is concerned, are shown in Figure 9. Referring to this figure, it will be noted that the relay comprises two coils 102 and 103 of the solenoid type. A pivoted armature 104 has core members cooperating with these coils and carries a contact arm 105 which is adapted to engage with contacts 106 and 107. Contacts 106 and 107 are formed on the end of contact screws 108 and 109 which are supported by posts 110 and 111. These posts are secured to the insulating plate 99 by any suitable fastening means. It will be readily understood that upon coil 103 being more highly energized than coil 102 the armature is moved in such a manner as to bring contact 105 into engagement with contact 106, and that similarly when relay coil 102 is more highly energized than relay coil 103 the contact arm 105 is moved into engagement with contact 107.

The relative energizations of the two coils 102 and 103 of the relay are controlled by the potentiometer 18, best shown in Figures 7 and 10. This potentiometer consists of a resistance 115 which is wound on an insulating rod supported at one end directly by the insulating plate 90 and at the other end by a supporting member 116 of metal. Cooperating with the resistance 115 and the support 116 are two flexible contact arms 117 and 118 which are electrically connected together and are mounted on an arm 120 of insulating material, which arm is, in turn, secured to a shaft 121. The arms 117 and 118 are always in sliding engagement with the resistance 115 and the support 116, respectively. The arm 118 thus serves to connect the arm 117 with the fixed support member 116. The shaft 121 is supported by a bracket 122. Secured to the opposite end of shaft 121 is an arm 123, best shown in Figures 2 and 7, which carries a roller 124 adapted to act as a cam follower and cooperate with the cam 17. A spring 125 has one end connected to the support 122 and the other end to the arm 120 and serves to bias the arm 123 into engagement with the cam 17. In certain types of apparatus, it is desirable that an extra potentiometer be provided for the purpose of controlling other apparatus in accordance with the position of the primary apparatus. Such additional potentiometer is indicated generally by the reference numeral 126 and it is to be understood that it is identical in construction to the potentiometer 18. The contact arms of both potentiometers are connected to the arm 120 and so are actuated simultaneously.

In order to limit the motion of the motor in either direction, it is necessary to provide limit switches. These limit switches consist of a pair of flexible switch blades 128 and 129 which are biased into engagement with contacts carried by rigid contact carrying members 130 and 131. This structure is best shown in Figures 8 and 11. Secured to the arm 120 is a U-shaped bracket 133. This bracket is disposed with the legs thereof extending outwardly. A screw 134 extends through each leg and is adapted to engage with one of the flexible blades 128 and 129. Upon the arm 120 moving to one extreme position, the switch blade 128 is separated from its associated contact by the engagement of one of the screws 134 therewith. Upon the movement of arm 120 to the opposite extreme position, the switch blade 129 is separated from its associated contact by the engagement of the other screw 134 therewith. The opening of these switches is employed for the purpose of stopping the operation of the motor when such extreme limits of movement are reached. The cam 17 is provided with an abrupt toe portion 136 and an abrupt heel portion 137. These two portions correspond to the extreme positions and serve to quickly actuate the arm 120 and thus quickly open the limit switches.

The resistors 20 and 21 are also mounted upon the insulating plate 90 by suitable fastening means. These insulators are located to one side of the limit switches and occupy space which would otherwise be of no utility.

The arm 16 may be of any suitable desired form and forms no part of the present invention. This arm is shown as comprising a U-shaped member 140, as best indicated in Figures 3 and 7. This U-shaped member 140 is non-rotatably secured to the shaft 15. Rotatably mounted on the shaft 15 between the two legs of the U is an arm portion 141. This arm portion 141 is provided with various openings 142. A screw 143 is adapted to extend through the U-shaped arm and through one of the openings 142. It will thus be seen that the position of the arm portion 141 can be adjusted with respect to the shaft 15 by suitable selection of the hole 142 through which the screw 143 projects.

Terminal plate 94 briefly referred to previously as supporting the plate 90 serves as a means for connecting the apparatus to the various other pieces of apparatus to be employed therewith. The various terminals are shown in the schematic Figure 11 and are indicated therein by the reference numerals 145 to 150.

Referring now to Figure 11, a temperature control system is shown schematically employing the apparatus of the present invention. For convenience in understanding the operation of the system, the apparatus just described is shown in exploded form so that the electrical connection between the various elements may be more easily understood. In order to facilitate the correlation of this figure with the various other figures, the same reference numerals have been applied to the various elements of the apparatus just described as were employed in the detailed description thereof. In this figure, moreover, the electrical arrangement of certain elements, which have merely been described so far as the physical construction is concerned, is shown in schematic form. Thus, it will be noted that the relay coils 102 and 103 each actually consist of a main coil and a booster coil. Thus coil 102 consists of a main coil 155 and a booster coil 156. Similarly, the coil 103 consists of a main coil 157 and a booster coil 158.

It will further be noted from the schematic showing in Figure 11 that the motor 13 consists of field windings 159 and 160. It may be explained that these two windings permit the motor to be operated as a two phase motor. This is accomplished by connecting a condenser in series with one or the other of the windings and thus displacing the phase of the current flowing through that winding. The relay 19 serves to vary the connection of the condenser with respect to the windings.

It is also evident from the schematic Figure 11 that the winding 75 of the autotransformer 23 is tapped at an intermediate point. Since the transformer is a step-up transformer, the entire winding constitutes the secondary, while the lower portion constitutes the primary.

The system of Figure 11 is shown in connection with the operation of a valve 165. The stem of this valve is operatively connected through any suitable means to the arm 16 so as to be operated by the motor 13. The valve 165 can be employed for the control of any suitable medium, such as steam, used in condition control systems.

A thermostatic controller is generally indicated by the reference numeral 170. This controller consists of a bimetal element 171 and a contact arm 172 secured thereto and actuated thereby. The contact arm 172 is adapted to cooperate with a resistance 173. Contact arm 172 and resistance 173 thus form a potentiometer whose position is adjusted in accordance with the temperature adjacent thermostatic element 171. It is to be understood that in place of the temperature responsive element 171, other condition responsive elements can be substituted where it is desired to control according to a different condition than temperature.

A transformer 174 is employed to supply low voltage power for operation of the system. The transformer 174 consists of a high voltage primary 175 and a low voltage secondary 176. The high voltage primary 175 is connected to line wires 177 leading to a suitable source of power (not shown). The secondary 176 is connected to supply terminals 149 and 150 so that these terminals are at the potentials of the opposite ends of the secondary 176. Accordingly, in tracing circuits in a subsequent part of the description, these circuits will be traced from supply terminals 149 and 150 rather than back to the secondary 176.

The rebalancing potentiometer 18 and the main control potentiometer 170 are connected in parallel directly to each other. Thus, the upper end of resistance 115 of control potentiometer 116 is connected through conductor 185 to terminal 145 while the lower end of potentiometer 18 is connected through conductor 186 to terminal 146. Similarly, the opposite ends of the resistance 173 of the control potentiometer 170 are connected through conductors 187 and 188 with terminals 145 and 146, respectively. As previously described, the contact arm 117 is always electrically connected to the support 116 and since support 116 is connected through a conductor 189 with terminal 147, contact arm 117 is always electrically connected with terminal 147. Also connected to the same terminal by conductor 190 and bimetallic element 171 is the contact arm 172 of the control potentiometer 170.

The two potentiometers are not only connected in parallel with each other as described above, but are also connected in parallel with the main relay coils 155 and 157 of the relay 19, the connection with the relay coils being made through protective resistors 20 and 21. As previously explained, terminal 145 is connected both to the upper end of the resistance 115 of control potentiometer 18 and the left hand end of resistance 173 of the control potentiometer 170, while terminal 146 is connected to the other ends of the resistances of these two potentiometers. The terminal 145 is also connected to one end of the main coil winding 155 through the following circuit: conductor 191, protective resistor 20, conductor 192, terminal 149, and conductor 193. The terminal 146 is connected to one end of the main coil 157 through the following circuit: conductor 195, protective resistor 21, conductor 196, terminal 150, and conductor 197. The opposite ends of the main coils 155 and 157 are connected through conductors 198 and 199 to the terminal 147 which, as previously explained, is connected to both the contact arm 172 of potentiometer 170 and contact arm 117 of potentiometer 18.

As previously explained, the secondary 176 of transformer 174 is connected to the supply terminals 149 and 150. It will be noted that one of these terminals is connected through conductor 193 with one end of one of the main coils and the other terminal is connected to conductor 197 with the other end of the main coils. It will thus be seen that the main relay coils 155 and 157 are connected in series across the supply terminals. Moreover, the supply terminals 149 and 150 are connected to the outside terminals of the potentiometers 170 and 18 through resistors 20 and 21, respectively. These resistors function as protective resistors and prevent the transformer from being short circuited if the contact arms of the potentiometers assume opposite extreme positions.

It will be seen from the preceding description that the relay coils are directly connected across the source of power and connected in parallel with these relay coils across this source of power are potentiometers 170 and 18. It will further be seen that by reason of these parallel connections the two potentiometers act as voltage dividers and that any movement of contact arm 172, for example, to the left causes an increase in the energization of relay coil 157 and a decrease in the energization of relay coil 155. An opposite movement of the contact arm 172 will cause an increase in the energization of relay coil 155 and a decrease of energization of relay coil 157. Likewise, any movement of contact arm 117 of rebalancing potentiometer 18 upwardly causes an increase in the energization of relay coil 157 and a decrease in energization of relay coil 155. Similarly, any movement of the contact arm 117 in the opposite direction causes an increase in the energization of relay coil 155 and a decrease in the energization of relay coil 157. From the preceding, it will be obvious that any movement of contact arm 172 in one direction can be compensated for by a movement of contact arm 117 in the opposite direction. In the operation of the system, the motor is so actuated as the result of the movement of contact arm 172 in one direction that the resultant movement thereof causes contact arm 117 to move in the opposite direction to rebalance the system and terminate operation of the motor.

Operation

Bimetallic element 171 of the main controller 170 is so arranged that any decrease in temperature causes contact arm 172 to move to the right and any increase in temperature causes the same to move to the left. This is indicated in the drawings by legends wherein C represents cold and H represents hot. The various elements are shown in the drawings in the position occupied when the temperature of the controlling medium is approximately at the desired value. Let it now be assumed that the temperature of the controlling medium decreases so as to cause movement of contact arm 172 to the right. As previously explained, such movement will cause an increase in the energization of coil 155 and a decrease in the energization of coil 157. This will result in the armature 104 being turned in a clockwise direction causing the engagement of contact arm 105 with contact 107. As soon as this takes place, energizing circuits are established to the field windings 159 and 160 of motor 13. The energizing circuit for field winding 159 is as follows: supply terminal 150, conductor 205, contact arm 105, contact 107, conductor 206, booster coil 156, conductor 207, limit switch blade 129, contact support 131, conductor 208, terminal 84, conductor 209, field winding 159, conductor 210, terminal 82, and conductor 211 to the other supply terminal 149. It will be noted that this energizing circuit extends directly to the field winding 159.

The energizing circuit for field winding 160 is as follows: from supply terminal 150, conductor 205, contact arm 105, contact 107, conductor 206, booster coil 156, conductor 207, limit switch blade 129, contact support 131, conductor 208, terminal 84, conductor 214, primary portion of winding 75 of transformer 23, conductor 215, terminal 83, conductor 216, field winding 160, conductor 210, terminal 82, and conductor 211 to the other supply terminal 149. It will be noted that the circuit of field winding 160 just traced includes the primary portion of the winding of autotransformer 23. In view of the fact that condenser 122 is connected across the winding 75, the effect of the inclusion of the primary portion of winding 75 is to introduce a capacitance effect into the circuit to field winding 160 so as to cause the current flowing through this winding to lead in phase that flowing through field winding 159. The result is that there is a phase displacement in the currents energizing the two field windings so that the motor is caused to rotate. The resultant rotation operates through the gear train 14 to rotate the shaft 15 in such a manner to cause the crank arm 16 to rotate in a counter-clockwise direction. Such counter-clockwise movement of the arm 16 is effective to raise the valve stem of valve 165 and move the valve towards open position. At the same time that shaft 15 is causing a counter-clockwise movement of arm 16, it is also causing a counter-clockwise movement of cam 17 which is effective to cause the arm 123 to move in a counter-clockwise direction, which in turn causes contact arm 117 to move upwardly on the resistance 115. It will be recalled from the preceding description that this movement of contact arm 117 has an effect upon the energization of relay coils 155 and 157 which is opposite to that caused by a movement to the right of contact arm 172. Thus after a predetermined movement of shaft 15, contact arm 117 will have moved sufficiently upwardly upon resistance 115 to compensate for the movement to the right of contact arm 172 and will thus rebalance the energization of relay coils 155 and 157. Thus the movement of the arm 16 will be proportional to the amount of deviation of contact arm 172 from its mid position. In the preceding tracing of the energizing circuits of the field windings 159 and 160, it will be noted that both of these circuits extended through the booster coil 156. The purpose of the booster coil being included in the motor circuit is that the booster coil becomes energized and aids the coil 155 so as to hold contact blade 105 more securely in engagement with contact 107. It is to be understood that the movement of arm 172 is very gradual so that when contact arm 105 is moved into engagement with contact 107, the unbalance in the energization of relay coils 155 and 157 may be so slight that a very unsteady engagement of contact arm 105 with contact 107 is effected. By providing the booster coil 156 which is energized immediately upon engagement of contact arm 105 with contact arm 107, the contact pressure between these two contact making members is immediately increased so as to avoid any possibility of the contacts chattering.

It will also be noted that the circuits to both field windings 159 and 160 extend through the limit switch consisting of limit switch blade 129 and contact support 131. The purpose of this is to insure that when these two limit switch members are separated by the engagement of screw 134 with limit switch blade 120, the motor will be effectively deenergized to prevent further movement thereof. This separation of these two switch members, as previously explained, occurs when the shaft 15 has rotated to a position corresponding to the end of the desired movement of the valve.

The operation in the preceding paragraphs has been traced to the point where the rebalance of the system has been effected by contact arm 117 moving an amount corresponding to the movement of contact arm 172 to the right as a result of a decrease in temperature. The resultant opening of valve 165 will cause more steam to be supplied to the radiator or other device utilizing the same. The result of this increase in flow of steam is to cause the temperature in the room to again rise. This will cause the contact arm 172 to move in the opposite direction towards the left. The movement of contact arm 172 towards the left will result in relay coil 157 becoming more highly energized than relay coil 155. This will cause counter-clockwise movement of armature 104 and movement of contact arm 105 into engagement with contact 106. The result will be that energizing circuits will be again established to both field windings 159 and 160. The energizing circuit to field winding 159 will be as follows: from supply terminal 150 through conductor 205, contact arm 105, contact 106, conductor 220, booster coil 158, conductor 221, limit switch blade 128, contact support 130, conductor 222, terminal 83, conductor 215, the primary portion of winding 75, conductor 214, terminal 84, conductor 209, field winding 159, conductor 210, terminal 82, and conductor 211 to the other supply terminal 149. The energizing circuit to field winding 160 is as follows: from supply terminal 150 through conductor 205, contact arm 105, contact 106, conductor 220, booster coil 158, conductor 221, limit switch blade 128, contact support 130, conductor 222, terminal 83, conductor 216, field winding 160, conductor 210, contact 82, and conductor 211 to the other supply terminal 149. It will be noted that in the circuits just traced, the energizing circuit to field winding 159 is now the circuit which includes the primary portion of the winding 75 of the autotransformer and which consequently is the one which is subjected to the capacitance effect of condenser 22. The energizing circuit to field winding 160 is now the one which is a direct energizing circuit and includes no capacitance. The result is that the current to field winding 159 now leads the current through field winding 160 so that the motor is caused to rotate in a direction opposite to that which is effected upon the engagement of contact 105 with contact 107.

As in the preceding case, it will be noted that the energizing circuits to the motor include a booster coil, in this case, the booster coil 158. The effect of the energization of this booster coil is to cause contact arm 105 to be more firmly engaged with contact 106 for the same purpose as the contact pressure of contact arm 105 and contact 107 was increased by the energization of booster coil 156. It will further be noted that the energizing circuits to both motor windings now include the limit switch comprising limit switch blade 128 and contact support 130. Thus, upon the movement of shaft 15 in the direction such as to disengage these two limit switch members, further movement of the motor will be interrupted.

The resultant rotation of motor 13 will be in a direction opposite to that previously described by reason of the current in field winding 159 now leading that in field winding 160. Shaft 15 will, accordingly, be rotated in the opposite direction to cause clockwise movement of arm 16. The clockwise movement of arm 16 causes a movement of valve 165 towards closed position. The movement of contact arm 117 towards closed position thus reduces the flow of steam or other conditioning medium. The movement of shaft 15 in this direction also causes a clockwise movement of cam 17 which results in a clockwise movement of arm 123. This, in turn, produces a downward movement of contact arm 117. The downward movement of contact arm 117 will, as will be recalled from the previous description, affect the energization of relay coils 155 and 157 in the opposite manner to that in which the movement to the left of contact arm 172 affected such energization. The result will be that after a movement of the shaft 15 and consequent movement of arm 117 to an extent corresponding to the movement of contact arm 172, the energization of relay coils 155 and 157 will again be balanced causing the motor to be deenergized.

It will be seen from the preceding description that the position of the valve 165 always bears a direct relation to the position of contact arm 172 on resistance 173. The general operation of this system just described does not, however, form a part of my invention, and any description of the same has been incorporated for the purpose of giving clearer understanding of the function of the various elements of the apparatus which form the subject matter of the present application.

It will be readily seen that the control apparatus of the present application forms a very compact piece of apparatus which is both highly sensitive and also capable of operating rather large loads. It will be further seen that the apparatus allows an arrangement of elements in a manner which, while extremely compact, permits incorporation of the same in a system of the proportioning type so as to give the desired operation.

While the apparatus has been described as temperature control apparatus, it is to be understood that the same may be used in any condition control system. Moreover, while the same is particularly designed for condition control systems, it is to be understood that various features of the same are applicable to other motor control systems, particularly those of the follow-up type wherein a motor driven element is variably positioned in accordance with the position of a main controller. In general while a specific embodiment of the invention has been shown, it is to be understood that this is for purposes of illustration only and that the invention is to be limited only by the scope of the appended claims.

I claim as my invention:

1. Condition controlling apparatus for use with a condition responsive controller to regulate a condition changing device, said apparatus comprising a condenser motor including a motor unit and a condenser unit, a reduction gear train connected to said motor, mechanism including a switch for controlling the extent of movement of said motor, and a sealed housing containing oil and having a portion projecting from one side thereof, said motor unit and said reduction gear train being located in said housing and extending into said oil, said condenser unit being located outside of said casing beneath said projecting portion, and said mechanism for controlling the extent of movement of said motor being located on top of said casing and extending over said projecting portion.

2. Condition controlling apparatus for use with a condition responsive controller to regulate a condition changing device, said apparatus comprising a condenser motor including a motor unit and a condenser unit, a reduction gear train connected to said motor, a shaft connected to the low speed end of said gear train and adapted to be operatively connected to a regulator for a condition changing device, mechanism including a switch for controlling the extent of movement of said motor, a sealed housing containing oil and having a portion projecting from one side thereof, aligned bearings located in said projecting portion and in the side of said casing opposite to said projecting portion, said shaft being journaled in said bearing portions, said motor unit and said reduction gear train being located in said housing and extending into said oil, said condenser unit being located outside of said casing beneath said projecting portion, and said mechanism for controlling the extent of movement of said motor being located on top of said casing.

3. Condition controlling apparatus for use with a condition responsive controller to regulate a condition changing device, said apparatus comprising a condenser motor including a motor unit, a condenser unit, and a transformer, a reduction gear train connected to said motor, mechanism including a switch for controlling the extent of movement of said motor, and a sealed housing containing oil and having a portion projecting from one side thereof, said motor unit and said reduction gear train being located in said housing and extending into said oil, said condenser unit and said transformer being located outside of said casing beneath said projecting portion, and said mechanism for controlling the extent of movement of said motor being located on top of said casing and extending over said projecting portion.

4. Controlling apparatus for use with a main controller to regulate a controlled device, said apparatus comprising a motor, a reduction gear train connected to said motor, and a shaft connected to the low speed end of said gear train and adapted to be operatively connected to a regulator for the controlled device, a housing for enclosing said motor and reduction gear train, said housing having a removable side wall, spaced bearing plates operatively supporting the elements of said gear train, means securing said motor to one of said bearing plates, and means securing said bearing plates to said side wall in definite spaced relationship to each other whereby said motor and said reduction gear train are operatively supported by said side wall independently of the rest of said housing.

5. Controlling apparatus for use with a main controller to regulate a controlled device, said apparatus comprising a motor, a reduction gear train connected to said motor, and a shaft connected to the low speed end of said gear train and adapted to be operatively connected to a regulator for the controlled device, a sealed housing containing oil and enclosing said motor and reduction gear train partially immersed in oil, said housing having a removable side wall, spaced bearing plates operatively supporting the elements of said gear train, means securing said motor to one of said bearing plates, and means securing said bearing plates to said side wall in definite spaced relationship to each other whereby said motor and said reduction gear train are operatively supported by said side wall independently of the rest of said housing.

6. Controlling apparatus for use with a main controller to regulate a controlled device, said apparatus comprising a motor, a reduction gear train connected to said motor, and a shaft connected to the low speed end of said gear train and adapted to be operatively connected to a regulator for the controlled device, a housing for enclosing said motor and reduction gear train, said housing having a projecting bearing portion in one side wall thereof and having the side wall opposite to that in which said bearing is located removable, said removable side wall having a second bearing portion, said shaft being journaled in said bearing portions, and means supporting said motor and said reduction gear train entirely from said removable wall so that the relative position of said motor and the elements of said reduction gear train are independent of the relative position of said removable wall with respect to said housing.

7. Controlling apparatus for use with a main controller to regulate a controlled device, said apparatus comprising a motor, a reduction gear train connected to said motor, and a shaft connected to the low speed end of said gear train and adapted to be operatively connected to a regulator for the controlled device, a housing for enclosing said motor and reduction gear train, said housing having a projecting bearing portion in one side wall thereof and having the side wall opposite to that in which said bearing is located removable, said removable side wall having a second bearing portion, said shaft being journaled in said bearing portion, means supporting said motor and said reduction gear train entirely from said removable wall so that the relative position of said motor and the elements of said reduction gear train are independent of the relative position of said removable wall with respect to said housing, and a condenser associated with said motor and located outside of said housing beneath said projecting bearing portion.

8. Temperature controlling apparatus for use with a temperature responsive controller to regulate a temperature changing device, said apparatus comprising a condenser motor including a motor unit and a condenser unit, a reduction gear train connected to said motor, mechanism including a switch for controlling the extent of movement of said motor, and a sealed housing containing oil and having a portion projecting from one side thereof, said motor unit and said reduction gear train being located in said housing and extending into said oil, said condenser unit being located outside of said casing beneath said projecting portion, and said mechanism for controlling the extent of movement of said motor being located on top of said casing and extending over said projecting portion.

9. Condition controlling apparatus for use with a condition responsive controller to regulate a condition changing device, said apparatus comprising a condenser motor including a motor unit and a condenser unit, a reduction gear train connected to said motor, mechanism for controlling the extent of movement of said motor, said mechanism including a relay, and a variable resistance for controlling the energization of said relay, and a sealed housing containing oil and having a portion projecting from one side thereof, said motor unit and said reduction gear train being located in said housing and extending into said oil, said condenser unit being located outside of said casing beneath said projecting portion, and said mechanism for controlling the extent of movement of said motor being located on top of said casing and extending over said projecting portion.

10. Condition controlling apparatus for use with a condition responsive controller to regulate a condition changing device, said apparatus comprising a condenser motor including a motor unit and a condenser unit, a reduction gear train connected to said motor, mechanism for controlling the extent of movement of said motor, said mechanism including a balanced relay, a potentiometer for controlling the balance of the energization of the relay, an operative connection between said shaft and the movable contact of said potentiometer, and a sealed housing containing oil and having a portion projecting from one side thereof, said motor unit and said reduction gear train being located in said housing and extending into said oil, said condenser unit being located outside of said casing beneath said projecting portion, and said mechanism for controlling the extent of movement of said motor being located on top of said casing and extending over said projecting portion.

11. Controlling apparatus for use with a main controller to regulate a controlled device, said apparatus comprising a condenser motor including a motor unit and a condenser unit, a reduction gear train connected to said motor, a shaft connected to the low speed end of said gear train and adapted to be operatively connected to a regulator for the controlled device, a housing enclosing said motor and said gear train, said housing having a removable side wall containing a bearing for said shaft, the opposite side wall of said housing having a bearing portion for said shaft projected outwardly from the main portion of said side wall to provide a substantially large spacing between said bearings whereby the effect of a slight change in the relative positions of said removable wall and said housing upon the position of said shaft is minimized, and means mounting said condenser outside of said housing beneath said projecting portion.

12. Controlling apparatus for use with a main controller to regulate a controlled device, said apparatus comprising a condenser motor including a motor unit, a condenser unit and a transformer, a reduction gear train connected to said motor, a shaft connected to the low speed end of said gear train and adapted to be operatively connected to a regulator for the controlled device, a housing enclosing said motor and said gear train, said housing having a removable side wall containing a bearing for said shaft, the opposite side wall of said housing having a bearing portion for said shaft projected outwardly from the main portion of said side wall to provide a substantially large spacing between said bearings whereby the effect of a slight change in the relative positions of said removable wall and said housing upon the position of said shaft is minimized, and means mounting said condenser and transformer outside of said housing beneath said projecting portion.

13. Controlling apparatus for use with a main controller to regulate a controlled device, said apparatus comprising a condenser motor including a motor unit and a condenser unit, a reduction gear train connected to said motor, a shaft connected to the low speed end of said gear train and adapted to be operatively connected to a regulator for the controlled device, a sealed housing containing oil enclosing said motor and said gar train partially immersed in oil, said housing having a removable side wall containing a bearing for said shaft, the opposite side wall of said housing having a bearing portion for said shaft projected outwardly from the main portion of said side wall to provide a substantially large spacing between said bearings whereby the effect of a slight change in the relative positions of said removable wall and said housing upon the position of said shaft is minimized, and means mounting said condenser outside of said housing beneath said projection portion.

14. Controlling apparatus for use in a follow-up system employing a variably positioned controller to variably position a controlled device in accordance with the position of said controller, said apparatus comprising a condenser motor including a motor unit and a condenser unit, a reduction gear train connected to said motor, a shaft connected to the low speed end of said gear train and adapted to be operatively connected to a regulator for the controlled device, follow-up mechanism operated by said motor for terminating the operation of said motor upon the controlled device having moved to a position corresponding to the position of said controller, a housing enclosing said motor and said gear train, said housing having a removable side wall containing a bearing for said shaft, the opposite side wall of said housing having a bearing portion for said shaft projected outwardly from the main portion of said side wall to provide a substantially large spacing between said bearings whereby the effect of a slight change in the relative positions of said removable wall and said housing upon the position of said shaft is minimized, means supporting said follow-up mechanism on top of said housing extending over said projecting portion, and means mounting said condenser outside of said housing beneath said projecting portion.

WILLIAM H. EDMONDSON.